US012152563B1

(12) United States Patent
Su et al.

(10) Patent No.: US 12,152,563 B1
(45) Date of Patent: Nov. 26, 2024

(54) METHOD, APPARATUS, AND ELECTRONIC DEVICE FOR DETECTING WIND TURBINE BLADE BASED ON DRONE AERIAL PHOTOGRAPHY

(71) Applicant: NYOCOR INTELLIGENT MAINTENANCE (NINGXIA) TECHNOLOGY CO., LTD, Ningxia (CN)

(72) Inventors: Yang Su, Ningxia (CN); Dashuai Hao, Ningxia (CN); Haiyang Li, Ningxia (CN); Kaiwen Jia, Ningxia (CN); Yaowen Yang, Ningxia (CN)

(73) Assignee: NYOCOR INTELLIGENT MAINTENANCE (NINGXIA) TECHNOLOGY CO., LTD, Yinchuan (CN)

( * ) Notice: Subject to any disclaimer, the term of this patent is extended or adjusted under 35 U.S.C. 154(b) by 0 days.

(21) Appl. No.: 18/424,268

(22) Filed: Jan. 26, 2024

Related U.S. Application Data (63) Continuation of application No. PCT/CN2023/125135, filed on Oct. 18, 2023.

(30) Foreign Application Priority Data

Sep. 26, 2023 (CN) .......................... 202311257962.0

(51) Int. Cl.
 *F03D 17/00* (2016.01)
(52) U.S. Cl.
 CPC ......... *F03D 17/004* (2023.08); *F03D 17/003* (2023.08); *F03D 17/028* (2023.08)
(58) Field of Classification Search
 CPC ......... G06T 1/0014; G06T 7/20; G06T 7/246; G06T 7/30; G06T 7/33; G06T 7/593;
 (Continued)

(56) References Cited

U.S. PATENT DOCUMENTS 11,585,768 B1 * 2/2023 Na ........................ G01N 23/083
2020/0018291 A1 * 1/2020 Rosen ..................... F03D 80/50
(Continued)

FOREIGN PATENT DOCUMENTS

CN 110554704 A 12/2019
CN 112577606 A 3/2021
(Continued)

OTHER PUBLICATIONS

International Search Report and Written Opinion for Application No. PCT/CN2023/125135, mailed on May 20, 2024, 16 pages.
(Continued)

*Primary Examiner* — Andrew W Johns
(74) *Attorney, Agent, or Firm* — DLA Piper LLP (US)

(57) ABSTRACT

A method, an apparatus, an electronic device, and a computer-readable storage medium for detecting a wind turbine blade based on drone aerial photography are provided. The method includes: determining first initial three-dimensional position coordinates and a posture of a wind turbine; determining second initial three-dimensional coordinates of a first expected position with respect to a front shooting position of the wind turbine, based on the first initial three-dimensional position coordinates, the posture, and a preset distance; inputting the second initial three-dimensional coordinates of the first expected position into a flight control system of the drone, and controlling the drone to fly to the second initial three-dimensional coordinates based on a GPS system; and controlling the drone to track at least one first key point of blades of the wind turbine, and determining a three-dimensional movement trajectory of the first key point in a camera coordinate system.

20 Claims, 3 Drawing Sheets

(58) Field of Classification Search
CPC ... G06T 7/70; G06T 7/73; G06T 2207/30164; G06V 20/17; F03D 17/00; F03D 17/003; F03D 17/004; F03D 17/013; F03D 17/028; B64U 2101/30; B64U 2201/10; B64U 2201/104; G05D 1/0202; G05D 1/24; G05D 1/242; G05D 1/243; G05D 1/2435; G05D 1/2437; G05D 1/611
See application file for complete search history.

(56) References Cited

U.S. PATENT DOCUMENTS

| | | | |
|---|---|---|---|
| 2020/0057002 A1* | 2/2020 | Jung | F03D 17/00 |
| 2020/0293045 A1* | 9/2020 | Ghiglino Novoa et al. | G05D 1/0094 |
| 2020/0402220 A1* | 12/2020 | Dong et al. | G06V 20/17 |
| 2022/0050461 A1 | 2/2022 | Karachalios et al. | |
| 2023/0105991 A1* | 4/2023 | Karatajew et al. | F03D 17/00 416/61 |
| 2023/0366775 A1* | 11/2023 | Seng | G05D 1/0088 |
| 2024/0070850 A1* | 2/2024 | Moon et al. | G06T 11/00 |

FOREIGN PATENT DOCUMENTS

| | | |
|---|---|---|
| CN | 113107788 A | 7/2021 |
| CN | 113284102 A | 8/2021 |
| CN | 113296121 A | 8/2021 |
| CN | 113406107 A | 9/2021 |
| CN | 113610749 A | 11/2021 |
| CN | 114296483 A | 4/2022 |
| CN | 114639025 A | 6/2022 |
| CN | 115097867 A | 9/2022 |
| CN | 115143056 A | 10/2022 |
| CN | 116501091 A | 7/2023 |
| FR | 3132349 A1 | 8/2023 |
| JP | 2023072593 A | 5/2023 |
| KR | 20200031860 A | 3/2020 |
| WO | 2020053573 A1 | 3/2020 |

OTHER PUBLICATIONS

Office Action for Chinese Patent Application No. 202311257962, mailed Mar. 13, 2024, 10 pages.

Office Action for Chinese Patent Application No. 202311257962, mailed Apr. 15, 2024, 3 pages.

* cited by examiner

METHOD, APPARATUS, AND ELECTRONIC DEVICE FOR DETECTING WIND TURBINE BLADE BASED ON DRONE AERIAL PHOTOGRAPHY

CROSS-REFERENCE TO RELATED APPLICATIONS

This application is a Continuation Application of International Application No. PCT/CN2023/125135, filed Oct. 18, 2023, which claims priority to Chinese patent application No. 2023112579620, filed Sep. 26, 2023, with the China National Intellectual Property Administration, and entitled "Method, Apparatus, and Electronic Device for Detecting Wind Turbine Blade based on Drone Aerial Photography", the contents of which are incorporated by reference herein their entireties.

TECHNICAL FIELD

The present disclosure relates to the technical field of power equipment, and in particular, to a method, an apparatus, and an electronic device for detecting a wind turbine blade based on drone (unmanned aerial vehicle) aerial photography.

BACKGROUND ART mechanical work which drives a rotor to rotate, and finally outputs an alternating current. The wind driven generator is generally composed of members such as blades, a power generator, a direction regulator, a tower, a speed-limiting safety mechanism, and an energy storage means. During long-term operation of the wind driven generator, surfaces of the blades may have various kinds of damages, such as damage to a protective film of the blades, paint peeling of the blades, icing of the blades, cracking of the blades, and greasy dirt on the blades.

At present, when the surfaces of the blades are detected for damages, a drone-mounted camera is usually used to detect the wind turbine. Since the detection is performed based on images, shooting quality of the images directly affects the accuracy of a detection result. However, for current drones, there is a relatively large difference between an actual posture and an expected posture when shooting an image, which has a great impact on the image quality, and results in relatively low detection accuracy of the damages on the surfaces of the blades.

SUMMARY

The present disclosure provides a method, an apparatus, and an electronic device for detecting a wind turbine blade based on drone aerial photography, so as to at least alleviate the technical problem of relatively low detection accuracy of damages on surfaces of blades.

Some exemplary embodiments of the present disclosure provide a method for detecting a wind turbine blade based on drone aerial photography. The method for detecting a wind turbine blade may include following steps:
  determining first initial three-dimensional position coordinates and a posture of a wind turbine, wherein the first initial three-dimensional position coordinates may be coordinates in a GPS system, and the posture may include an orientation of the wind turbine;
  determining second initial three-dimensional coordinates of a first expected position with respect to a front shooting position of the wind turbine, based on the first initial three-dimensional position coordinates, the posture, and a preset distance, wherein the first expected position is located on a first normal vector corresponding to a first rotation center of a blade rotation plane of the wind turbine, and a distance between the first expected position and the first rotation center is the preset distance;
  inputting the second initial three-dimensional coordinates of the first expected position into a flight control system of the drone, and controlling the drone to fly to the second initial three-dimensional coordinates based on the GPS system, wherein an actual position of the drone is actual three-dimensional coordinates, and an offset between the first expected position and the actual three-dimensional coordinates is a target offset vector;
  controlling, based on the orientation of the wind turbine, the drone to track at least one first key point of blades of the wind turbine in a first posture with a binocular camera at the actual three-dimensional coordinates, and determining a three-dimensional movement trajectory of the first key point in a camera coordinate system;
  determining, in the camera coordinate system of the binocular camera, a second normal vector of a second rotation center corresponding to the three-dimensional movement trajectory of the first key point, converting the first normal vector into the camera coordinate system to obtain a third normal vector, and determining a first rotation matrix based on the second normal vector and the third normal vector;
  adjusting an orientation of the binocular camera based on the first rotation matrix, so that an actual orientation of a camera head of the binocular camera tends to be parallel to a normal corresponding to the first rotation center of an actual blade rotation plane, to obtain a second posture; further tracking at least one second key point of the blades with the binocular camera in the second posture, and determining a three-dimensional movement trajectory of the second key point in the camera coordinate system and further determining a second rotation matrix;
  judging whether a difference between the second rotation matrix further determined and the first rotation matrix meets a preset requirement, wherein if the preset requirement is met, the posture of the camera is controlled based on the orientation of the wind turbine and the second rotation matrix to shoot a front image of the wind turbine; and if the preset requirement is not met, iteration is continued until a difference between two adjacent rotation matrices meets the preset requirement or number of the iterations reaches a preset number; and
  determining third initial three-dimensional coordinates of a second expected position with respect to a back shooting position of the wind turbine based on the first initial three-dimensional position coordinates, the posture, and the preset distance, inputting the third initial three-dimensional coordinates of the second expected position into the flight control system of the drone, controlling, based on the GPS system, the drone to fly to a corresponding optimized position of the third initial three-dimensional coordinates, and controlling the camera to shoot a back image of the wind turbine based on the orientation of the wind turbine and the second rotation matrix at the corresponding optimized position of the third initial three-dimensional coordinates.

In a possible embodiment, the drone may be provided with a laser device; and the method for detecting a wind turbine blade further may include following steps:

controlling, when the wind turbine is in a stationary state, the drone to fly around the blades on the wind turbine based on all relative angles, and controlling the laser device to perform laser ranging on the blades multiple times by scanning all the time in a process of flying around the blades, so as to obtain a plurality of laser ranging results, and establishing a current model for the blades according to the plurality of laser ranging results;

comparing the current model with a preset model to obtain a model comparison result, wherein the preset model is a model of the blades in a normal state of the wind turbine before running; and detecting a damage degree of a blade surface of the wind turbine according to the model comparison result.

In a possible embodiment, the method for detecting a wind turbine blade further may include:

controlling, when the wind turbine is in operation, the drone to fly at a flying speed with respect to the blades that is kept greater than a rotating speed of the blades, so as to acquire the laser ranging results for a plurality of positions on the blades.

In a possible embodiment, at least two drones may be provided; and the method for detecting a wind turbine blade further may include following steps:

controlling, when the wind turbine is in operation, a first drone to fly at the same speed as the rotating speed of the blades, so as to keep the first drone and the blades relatively stationary; and controlling a second drone to fly at a flying speed with respect to the blades that is kept greater than the rotating speed of the blades, taking the second drone as a scanning drone for the blades and taking the first drone as a reference in a scanning process of the second drone, and acquiring the laser ranging results for the plurality of positions on the blades, through position data with the first drone as the reference and scanning data of the second drone for the blades.

In a possible embodiment, the method for detecting a wind turbine blade further may include:

measuring, by the first drone, according to its flying speed and flying position following the blades, the rotating speed of the blades, and controlling the flying speed of the second drone according to the rotating speed of the blades, so as to keep the flying speed of the second drone greater than the rotating speed of the blades;

sending, by the second drone to the first drone, laser ranging data obtained by scanning the blades; and calculating, by the first drone, data of a plurality of position points on surfaces of the blades through AI according to the laser ranging data and the rotating speed of the blades.

In a possible embodiment, the method for detecting a wind turbine blade further may include following steps:

taking, when a current electric quantity of the second drone is less than a first preset electric quantity, the first drone as the scanning drone for the blades, and taking the second drone as the reference in a scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and acquiring the laser ranging results for the plurality of positions on the blades, through position data with the second drone as the reference and scanning data of the first drone for the blades.

In a possible embodiment, the method for detecting a wind turbine blade further may include following steps:

taking, when a difference between current electric quantities of the first drone and of the second drone is greater than a second preset electric quantity, the first drone as the scanning drone for the blades, and taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and acquiring the laser ranging results for the plurality of positions on the blades, through position data with the second drone as the reference and scanning data of the first drone for the blades.

Some further exemplary embodiments of the present disclosure provide an apparatus for detecting a wind turbine blade based on drone aerial photography, wherein the apparatus for detecting a wind turbine blade may include:

a first determination module, configured to determine first initial three-dimensional position coordinates and a posture of a wind turbine, wherein the first initial three-dimensional position coordinates are coordinates in a GPS system, and the posture includes an orientation of the wind turbine;

a second determination module, configured to determine second initial three-dimensional coordinates of a first expected position with respect to a front shooting position of the wind turbine, based on the first initial three-dimensional position coordinates, the posture, and a preset distance, wherein the first expected position is located on a first normal vector corresponding to a first rotation center of a blade rotation plane of the wind turbine, and a distance between the first expected position and the first rotation center is the preset distance;

a first control module, configured to input the second initial three-dimensional coordinates of the first expected position into a flight control system of the drone, and control the drone to fly to the second initial three-dimensional coordinates based on the GPS system, wherein an actual position of the drone is actual three-dimensional coordinates, and an offset between the first expected position and the actual three-dimensional coordinates is a target offset vector;

a second control module, configured to control, based on the orientation of the wind turbine, the drone to track at least one first key point of blades of the wind turbine in a first posture with a binocular camera at the actual three-dimensional coordinates, and determine a three-dimensional movement trajectory of the first key point in a camera coordinate system;

a third determination module, configured to determine, in the camera coordinate system of the binocular camera, a second normal vector of a second rotation center corresponding to the three-dimensional movement trajectory of the first key point, convert the first normal vector into the camera coordinate system to obtain a third normal vector, and determine a first rotation matrix based on the second normal vector and the third normal vector;

an adjustment module, configured to adjust an orientation of the binocular camera based on the first rotation matrix, so that an actual orientation of a camera head of the binocular camera tends to be parallel to a normal corresponding to the first rotation center of an actual blade rotation plane, to obtain a second posture; further track at least one second key point of the blades with the binocular camera in the second posture, and determine a three-dimensional movement trajectory of the second key point in the camera coordinate system and further determine a second rotation matrix;

a judgment module, configured to judge whether a difference between the second rotation matrix further determined and the first rotation matrix meets a preset requirement, wherein if the preset requirement is met, the posture of the camera is controlled based on the orientation of the wind turbine and the second rotation matrix to shoot a front image of the wind turbine; and if the preset requirement is not met, iteration is continued until a difference between two adjacent rotation matrices meets the preset requirement or number of the iterations reaches a preset number; and a third control module, configured to determine third initial three-dimensional coordinates of a second expected position with respect to a back shooting position of the wind turbine based on the first initial three-dimensional position coordinates, the posture, and the preset distance, input the third initial three-dimensional coordinates of the second expected position into the flight control system of the drone, control, based on the GPS system, the drone to fly to a corresponding optimized position of the third initial three-dimensional coordinates, and control the camera to shoot a back image of the wind turbine based on the orientation of the wind turbine and the second rotation matrix at the corresponding optimized position of the third initial three-dimensional coordinates.

According to some exemplary embodiments, the drone may be provided with a laser device; and the apparatus for detecting a wind turbine blade further may include:

a fourth control module, configured to control, when the wind turbine is in a stationary state, the drone to fly around the blades on the wind turbine based on all relative angles, and control the laser device to perform laser ranging on the blades multiple times by scanning all the time in a process of flying around the blades, so as to obtain a plurality of laser ranging results, and establish a current model for the blades according to the plurality of laser ranging results;

a comparison module, configured to compare the current model with a preset model, to obtain a model comparison result, wherein the preset model is a model of the blades in a normal state of the wind turbine before running; and a detection module, configured to detect a damage degree of a blade surface of the wind turbine according to the model comparison result.

According to some exemplary embodiments, the apparatus for detecting a wind turbine blade further may include:
a fifth control module, configured to control, when the wind turbine is in operation, the drone to fly at a flying speed with respect to the blades that is kept greater than a rotating speed of the blades, so as to acquire the laser ranging results for a plurality of positions on the blades.

Some other exemplary embodiments of the present disclosure provide an electronic device, which may include a memory and a processor, and the memory stores a computer program executable on the processor, wherein when the processor performs the computer program, the above method for detecting a wind turbine blade is implemented.

Besides, some further exemplary embodiments of the present disclosure provide a computer-readable storage medium, wherein the computer-readable storage medium stores computer-executable instructions, and when the computer-executable instructions are invoked and executed by a processor, the computer-executable instructions cause the processor to execute the above method for detecting a wind turbine blade.

The embodiments of the present disclosure at least bring about the following beneficial effects:

the method, the apparatus, and the electronic device for detecting a wind turbine blade based on drone aerial photography provided in the embodiments of the present disclosure can determine the first initial three-dimensional position coordinates and the posture of the wind turbine, wherein the first initial three-dimensional position coordinates are the coordinates in the GPS system, and the posture includes the orientation of the wind turbine; determine the second initial three-dimensional coordinates of the first expected position with respect to the front shooting position of the wind turbine, based on the first initial three-dimensional position coordinates, the posture, and the preset distance, wherein the first expected position is located on the first normal vector corresponding to the first rotation center of the blade rotation plane of the wind turbine, and the distance between the first expected position and the first rotation center is the preset distance; input the second initial three-dimensional coordinates of the first expected position into the flight control system of the drone, and control the drone to fly to the second initial three-dimensional coordinates based on the GPS system, wherein the actual position of the drone is the actual three-dimensional coordinates, and the offset between the first expected position and the actual three-dimensional coordinates is the target offset vector; control, based on the orientation of the wind turbine, the drone to track at least one first key point of blades of the wind turbine in the first posture with the binocular camera at the actual three-dimensional coordinates, and determine the three-dimensional movement trajectory of the first key point in the camera coordinate system; determine, in the camera coordinate system of the binocular camera, the second normal vector of the second rotation center corresponding to the three-dimensional movement trajectory of the first key point, convert the first normal vector into the camera coordinate system to obtain a third normal vector, and determine the first rotation matrix based on the second normal vector and the third normal vector; adjust the orientation of the binocular camera based on the first rotation matrix, so that the actual orientation of the camera head of the binocular camera tends to be parallel to the normal corresponding to the first rotation center of an actual blade rotation plane, to obtain the second posture, further track at least one second key point of the blades with the binocular camera in the second posture, and determine the three-dimensional movement trajectory of the second key point in the camera coordinate system and further determine the second rotation matrix; judge whether a difference between the second rotation matrix further determined and the first rotation matrix meets a preset requirement, wherein if met, the posture of the camera is controlled based on the orientation of the wind turbine and the second rotation matrix to shoot the front image of the wind turbine, and if not, iteration is continued until the difference between two adjacent rotation matrices meets the preset requirement, or the number of the iterations reaches the preset number; and determine the third initial three-dimensional coordinates of the second expected position with respect to the back shooting position of the wind turbine based on the first initial three-dimensional position coordinates, the posture, and the preset distance, input the third initial three-dimensional coordinates of the second expected position into the flight control system of the drone, control, based on the GPS system, the drone to fly to a corresponding optimized position of the third initial three-dimensional coordinates, and control the camera to shoot the back image of the wind turbine based on the orientation of the wind turbine and the second rotation matrix at the corresponding optimized position of the third initial three-dimensional coordinates. In the present solution, the posture of the shooting camera can be adjusted by the binocular vision technique, and finally the images can be taken with a uniform orientation, the quality of the images is greatly improved, an identification accuracy rate is further improved when identified through a model, and the accuracy of damage detection on the blade surfaces is improved.

In order to make the above objectives, features, and advantages of the present disclosure more obvious and more understandable, preferable embodiments are particularly illustrated in the following to give detailed description with reference to the drawings.

BRIEF DESCRIPTION OF THE DRAWINGS

In order to more clearly illustrate the technical solutions in the embodiments of the present disclosure or in the related art, drawings which need to be used in the description of the embodiments or the related art will be introduced briefly below. Apparently, the drawings in the following description are merely for some embodiments of the present disclosure, and those ordinarily skilled in the art still could obtain other drawings in light of these drawings without using any inventive efforts.

DETAILED DESCRIPTION OF THE EMBODIMENTS

In order to make the objectives, technical solutions, and advantages of the embodiments of the present disclosure more clear, the technical solutions in the present disclosure will be described clearly and completely below with reference to the drawings. Apparently, only some but not all embodiments of the present disclosure are described. Based on the embodiments in the present disclosure, all of other embodiments obtained by those ordinarily skilled in the art without using any inventive efforts shall fall within the scope of protection of the present disclosure.

Terms "include", "have" and any variants thereof mentioned in the embodiments of the present disclosure are intended to be non-exclusive. For example, a process, a method, a system, a product or a device that includes a series of steps or units is not limited to listed steps or units, but optionally further includes other steps or units that are not listed, or optionally further includes other steps or units inherent to such process, method, product or device.

Currently, flight control of drones and positioning of wind turbines generally use the global positioning system (GPS). Although inter-system errors can be minimized with the same system, due to limited accuracy of GPS itself, the drones have a relatively large difference between an actual posture and an expected posture when shooting an image, which has a greater impact on the image quality, and results in relatively low detection accuracy of damages on surfaces of blades.

On this basis, embodiments of the present disclosure provide a method, an apparatus, an electronic device, and a computer-readable storage medium for detecting a wind turbine blade based on drone aerial photography. By this method, the technical problem of relatively low detection accuracy of the damages on the surfaces of the blades can be alleviated.

The embodiments of the present disclosure are further introduced below with reference to drawings.

Figure 1:
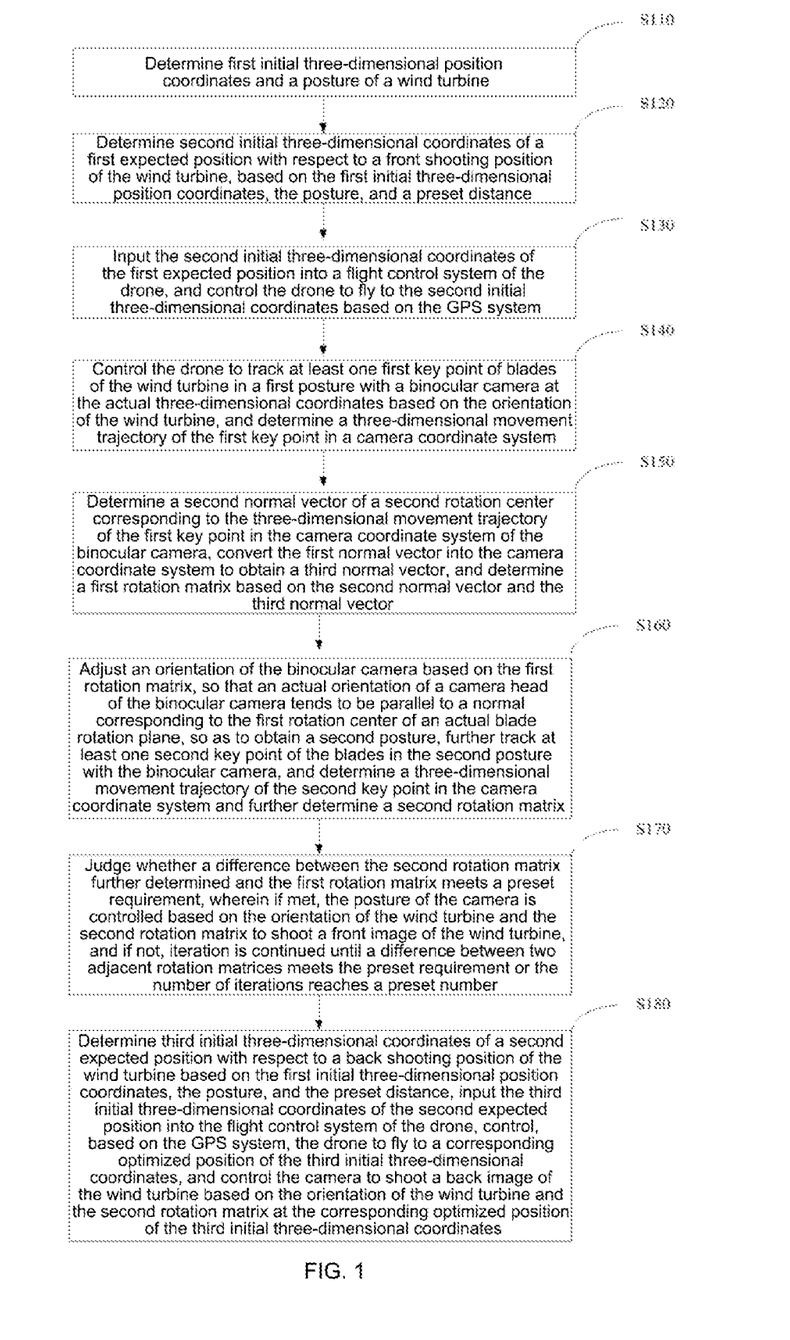
FIG. 1 is a schematic flowchart of a method for detecting a wind turbine blade based on drone aerial photography provided in an embodiment of the present disclosure.

FIG. 1 is a schematic flowchart of a method for detecting a wind turbine blade based on drone aerial photography provided in an embodiment of the present disclosure. As shown in FIG. 1, the method includes the following steps.

Step S110, determining first initial three-dimensional position coordinates and a posture of a wind turbine.

In the above, the first initial three-dimensional position coordinates are coordinates in a GPS system, and the posture includes an orientation of the wind turbine.

As a possible embodiment, the first initial three-dimensional position coordinates and the posture of the wind turbine are determined, wherein the first initial three-dimensional position coordinates may be coordinates in the GPS system of the world coordinate system, and the posture may include the orientation of the wind turbine.

Step S120, determining second initial three-dimensional coordinates of a first expected position with respect to a front shooting position of the wind turbine, based on the first initial three-dimensional position coordinates, the posture, and a preset distance.

In the above, the first expected position is located on a first normal vector corresponding to a first rotation center of a blade rotation plane of the wind turbine, and a distance between the first expected position and the first rotation center is the preset distance.

Figure 2:
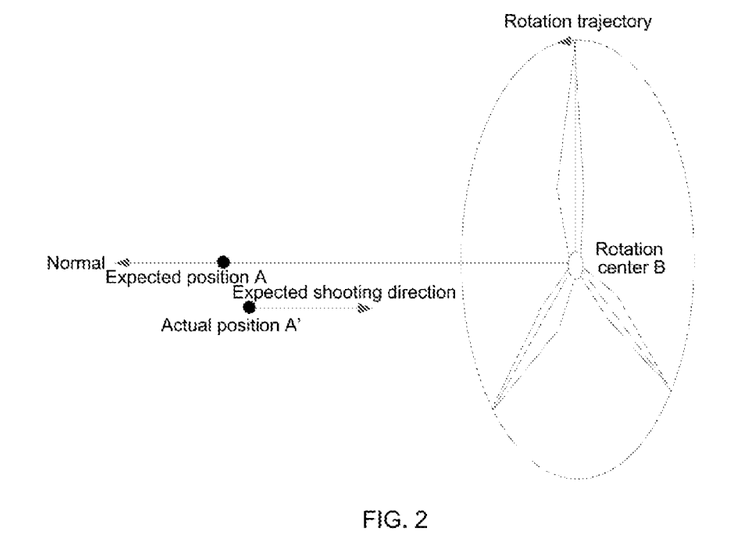
FIG. 2 is a schematic diagram of relative position between an expected position and an actual position provided in an embodiment of the present disclosure.

For example, as shown in FIG. 2, the second initial three-dimensional coordinates of an expected position A of the front shooting position are determined based on the first initial three-dimensional position coordinates and the posture of the wind turbine and a preset distance L. In the above, the expected position A is located on a normal (the first normal vector) corresponding to a rotation center of the blade rotation plane, and a distance between the expected position A and a rotation center B is the preset distance L.

Step S130, inputting the second initial three-dimensional coordinates of the first expected position into a flight control system of the drone, and controlling the drone to fly to the second initial three-dimensional coordinates based on the GPS system.

In the above, an actual position of the drone is actual three-dimensional coordinates, and an offset between the first expected position and the actual three-dimensional coordinates is a target offset vector.

As an example, as shown in FIG. 2, the second initial three-dimensional coordinates of the expected position A are input into the flight control system of the drone, and the drone is controlled to fly to the second initial three-dimensional coordinates based on the GPS system. Due to systematic errors of the GPS, the actual position of the drone is actual three-dimensional coordinates A'; and the offset between the expected position A and the actual three-dimensional coordinates A' is represented by an offset vector a1 (whose value needs to be calculated).

Step S140, controlling, based on the orientation of the wind turbine, the drone to track at least one first key point of blades of the wind turbine in a first posture with a binocular camera at the actual three-dimensional coordinates, and determining a three-dimensional movement trajectory of the first key point in a camera coordinate system.

Exemplarily, as shown in FIG. 2, the drone is controlled, based on the orientation of the wind turbine, to track one or more first key points of the blades in the first posture with the binocular camera at the actual three-dimensional coordinates A', and the three-dimensional movement trajectory of the one or more first key points in the camera coordinate system (without scale information) is determined.

Step S150, determining, in the camera coordinate system of the binocular camera, a second normal vector of a second rotation center corresponding to the three-dimensional movement trajectory of the first key point, converting the first normal vector into the camera coordinate system to obtain a third normal vector, and determining a first rotation matrix based on the second normal vector and the third normal vector.

In a possible embodiment, in the camera coordinate system, the second normal vector of a rotation center B' corresponding to the three-dimensional movement trajectory of the one or more first key points is determined, then the first normal vector is converted into the camera coordinate system to determine the third normal vector, and after that, the first rotation matrix is determined based on the second normal vector and the third normal vector.

Step S160, adjusting an orientation of the binocular camera based on the first rotation matrix, so that an actual orientation of a camera head of the binocular camera tends to be parallel to a normal corresponding to the first rotation center of an actual blade rotation plane, to obtain a second posture; further tracking at least one second key point of the blades with the binocular camera in the second posture, and determining a three-dimensional movement trajectory of the second key point in the camera coordinate system and further determining a second rotation matrix.

In the present step, first, the orientation of the binocular camera is adjusted based on the rotation matrix (due to existence of errors, the actual orientation of the camera head is not parallel to the normal corresponding to the rotation center of the actual blade rotation plane during a first time of shooting, and the adjustment herein aims at making the actual orientation of the camera head tend to be more parallel to the normal corresponding to the rotation center of the actual blade rotation plane), to obtain the second posture, and then, one or more second key points of the blades are further tracked with the binocular camera in the second posture, and the three-dimensional movement trajectory of the one or more second key points in the camera coordinate system (without scale information) is determined.

Step S170, judging whether a difference between the second rotation matrix further determined and the first rotation matrix meets a preset requirement, wherein if met, a front image of the wind turbine is shot by controlling the posture of the camera based on the orientation of the wind turbine and the second rotation matrix, and if not, iteration is continued until a difference between two adjacent rotation matrices meets the preset requirement, or the number of iterations reaches a preset number.

In practical application, it is judged whether the difference between the second rotation matrix further determined and the first rotation matrix meets the preset requirement, wherein if met, the posture of the camera is controlled based on the orientation of the wind turbine and the second rotation matrix to shoot the front image of the wind turbine, and if not met, iteration is continued until the difference between two adjacent rotation matrices meets the requirement or the number of iterations reaches a preset number.

Step S180, determining third initial three-dimensional coordinates of a second expected position with respect to a back shooting position of the wind turbine based on the first initial three-dimensional position coordinates, the posture, and the preset distance, inputting the third initial three-dimensional coordinates of the second expected position into the flight control system of the drone, controlling, based on the GPS system, the drone to fly to a corresponding optimized position of the third initial three-dimensional coordinates, and controlling the camera to shoot a back image of the wind turbine based on the orientation of the wind turbine and the second rotation matrix at the corresponding optimized position of the third initial three-dimensional coordinates.

As a possible embodiment, first, the third initial three-dimensional coordinates of an expected position M of the back shooting position are determined based on the first initial three-dimensional position coordinates and the posture of the wind turbine and the preset distance L, then the initial three-dimensional coordinates of the expected position M are input into the flight control system of the drone, the drone is controlled, based on the GPS system, to fly to a optimized position M' of the third initial three-dimensional coordinates, and after that, the high-speed camera is controlled, at the position M', to shoot the back image of the wind turbine based on the orientation of the wind turbine and the second rotation matrix. In this way, an image with an orientation directly facing the wind turbine can be shot, while the wind turbine is possibly not located at a center of the image.

In the embodiments of the present disclosure, the posture of the shooting camera can be adjusted by a binocular vision technique, and finally the images can be taken with a uniform orientation, so that the quality of the images is improved, an identification accuracy rate when identified through a model can be further improved, and the accuracy of damage detection on the blade surfaces is improved.

The above steps are introduced in detail below.

In some embodiments, the drone is provided with a laser device; and the method further may include the following steps:

step a), controlling, when the wind turbine is in a stationary state, the drone to fly around the blades on the wind turbine based on all relative angles, and controlling the laser device to perform laser ranging on the blades multiple times by scanning all the time in a process of flying around the blades, so as to obtain a plurality of laser ranging results, and establishing a current model for the blades according to the plurality of laser ranging results;

step b), comparing the current model with a preset model to obtain a model comparison result, wherein the preset model is a model of the blades in a normal state of the wind turbine before running; and step c), detecting a damage degree of a blade surface of the wind turbine according to the model comparison result.

In the embodiments of the present disclosure, by means of the laser ranging of the laser device on the drone and the flight of the drone around the blades on the wind turbine based on all relative angles, the plurality of laser ranging results for the blades can be obtained, and further a process of laser modeling can be realized, so that a modeling method of the blades is not merely limited to collected images, thus improving modeling efficiency of the blades.

Based on the above step a), step b), and step c), the method further may include the following step:

step d), controlling, when the wind turbine is in operation, the drone to fly at a flying speed with respect to the blades that is kept greater than a rotating speed of the blades, so as to acquire the laser ranging results for a plurality of positions on the blades.

In the embodiments of the present disclosure, for the blades in motion, the laser ranging can be performed on a plurality of parts of the blades with the flying speed of the drone greater than the rotating speed of the blades, while normal operation of the wind turbine is not affected, thus a detecting process of the blades is more efficient.

Based on the above step d), at least two drones are provided; and the method further may include the following steps:

step e), controlling, when the wind turbine is in operation, a first drone to fly at the same speed as the rotating speed of the blades, so as to keep the first drone and the blades relatively stationary; and step f), controlling a second drone to fly at a flying speed with respect to the blades that is kept greater than the rotating speed of the blades, taking the second drone as a scanning drone for the blades and taking the first drone as a reference (basis) in a scanning process of the second drone, and acquiring the laser ranging results for the plurality of positions on the blades through position data with the first drone as the reference and scanning data of the second drone for the blades.

For example, the blades rotate when the wind turbine runs, at this time, the first drone as the reference moves as the blades rotate, so that the first drone and the blades are relatively stationary, and a moving speed of the second drone as the scanning drone is different from the rotating speed of the blades, that is, there is a relative movement between the second drone and the blades, so that the second drone performs laser scanning on the blades, to obtains the laser ranging results for different positions on the blades.

In the embodiments of the present disclosure, by taking the first drone as the reference, a scanning action of the second drone as the scanning drone can take the first drone as a reference, so that laser scanning positions of the blades are more accurate, and data accuracy of the laser ranging results after the laser scanning is improved.

Based on the above step e) and step f), the method further may include the following steps:

step g), measuring, by the first drone, according to its flying speed and flying position following the blades, the rotating speed of the blades, and controlling the flying speed of the second drone according to the rotating speed of the blades, so as to keep the flying speed of the second drone greater than the rotating speed of the blades;

step h), sending, by the second drone to the first drone, laser ranging data obtained by scanning the blades; and step i), calculating, by the first drone, data of a plurality of position points on the surfaces of the blades through AI according to the laser ranging data and the rotating speed of the blades.

Exemplarily, the first drone as the reference also can function to share an auxiliary calculation pressure for the first drone, the first drone as the reference also can control the scanning action of the second drone, and then calculate the data of a plurality of position points on the surfaces of the blades more accurately through AI calculation according to the measured rotating speed of the blades.

In some embodiments, the method further can include the following steps:

step j), when a current electric quantity of the second drone is less than a first preset electric quantity, taking the first drone as the scanning drone for the blades, and taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and step k), acquiring the laser ranging results for the plurality of positions on the blades, through position data with the second drone as the reference and scanning data of the first drone for the blades.

It should be noted that, since the second drone taken as the scanning drone has a higher moving speed, and consumes more electric quantity, when the second drone as the scanning drone has a lower electric quantity, the first drone as the reference and the second drone as the scanning drone can be switched with each other, i.e., it is switched to that the second drone is taken as the reference and the first drone is taken as the scanning drone, so that a combined form of the first drone and the second drone can perform the laser scanning and ranging process for a longer time, and the laser scanning and ranging process is more efficient.

In some embodiments, the method further may include the following steps:

step m), when a difference between current electric quantities of the first drone and of the second drone is greater than a second preset electric quantity, and taking the first drone as the scanning drone for the blades, taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and step n), acquiring the laser ranging results for the plurality of positions on the blades, through position data with the second drone as the reference and scanning data of the first drone for the blades.

As an optional embodiment, when a difference between residual electric quantities of the first drone as the reference and of the second drone as the scanning drone is too large, the first drone and the second drone can be switched with each other, i.e., it is switched to that the second drone is taken as the reference and the first drone is taken as the scanning drone. In this way, an intelligent power distribution process between a plurality of drones is realized, and power usage efficiency of the drones in the laser scanning process is improved.

Figure 3:
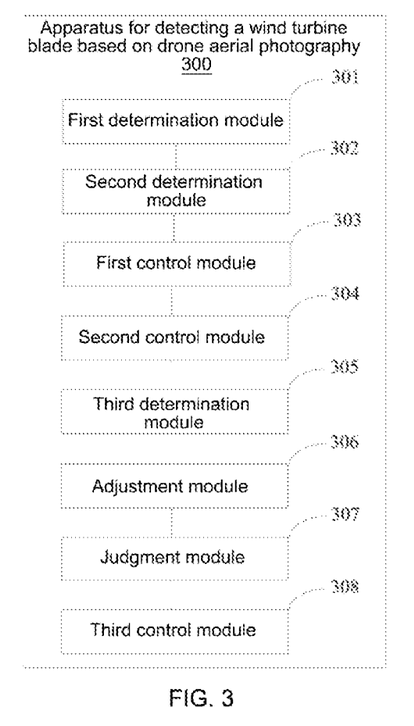
FIG. 3 is a structural schematic diagram of an apparatus for detecting a wind turbine blade based on drone aerial photography provided in an embodiment of the present disclosure.

FIG. 3 provides a structural schematic diagram of an apparatus for detecting a wind turbine blade based on drone aerial photography. As shown in FIG. 3, an apparatus 300 for detecting a wind turbine blade based on drone aerial photography includes:

a first determination module 301, configured to determine first initial three-dimensional position coordinates and a posture of a wind turbine, wherein the first initial three-dimensional position coordinates are coordinates in a GPS system, and the posture includes an orientation of the wind turbine;

a second determination module 302, configured to determine second initial three-dimensional coordinates of a first expected position with respect to a front shooting position of the wind turbine, based on the first initial three-dimensional position coordinates, the posture, and a preset distance, wherein the first expected position is located on a first normal vector corresponding to a first rotation center of a blade rotation plane of the wind turbine, and a distance between the first expected position and the first rotation center is the preset distance;

a first control module 303, configured to input the second initial three-dimensional coordinates of the first expected position into a flight control system of the drone, and control the drone to fly to the second initial three-dimensional coordinates based on the GPS system, wherein an actual position of the drone is actual three-dimensional coordinates, and an offset between the first expected position and the actual three-dimensional coordinates is a target offset vector;

a second control module 304, configured to control, based on the orientation of the wind turbine, the drone to track at least one first key point of blades of the wind turbine in a first posture with a binocular camera at the actual three-dimensional coordinates, and determine a three-dimensional movement trajectory of the first key point in a camera coordinate system;

a third determination module 305, configured to determine in the camera coordinate system of the binocular camera, a second normal vector of a second rotation center corresponding to the three-dimensional movement trajectory of the first key point, convert the first normal vector into the camera coordinate system to obtain a third normal vector, and determine a first rotation matrix based on the second normal vector and the third normal vector;

an adjustment module 306, configured to adjust an orientation of the binocular camera based on the first rotation matrix, so that an actual orientation of a camera head of the binocular camera tends to be parallel to a normal corresponding to the first rotation center of an actual blade rotation plane, to obtain a second posture; further track at least one second key point of the blades with the binocular camera in the second posture, and determine a three-dimensional movement trajectory of the second key point in the camera coordinate system and further determine a second rotation matrix;

a judgment module 307, configured to judge whether a difference between the second rotation matrix further determined and the first rotation matrix meets a preset requirement, wherein if met, the posture of the camera is controlled based on the orientation of the wind turbine and the second rotation matrix to shoot a front image of the wind turbine, and if not met, iteration is continued until a difference between two adjacent rotation matrices meets the preset requirement or the number of iterations reaches a preset number; and a third control module 308, configured to determine third initial three-dimensional coordinates of a second expected position with respect to a back shooting position of the wind turbine based on the first initial three-dimensional position coordinates, the posture, and the preset distance, input the third initial three-dimensional coordinates of the second expected position into the flight control system of the drone, control, based on the GPS system, the drone to fly to a corresponding optimized position of the third initial three-dimensional coordinates, and control the camera to shoot a back image of the wind turbine based on the orientation of the wind turbine and the second rotation matrix at the corresponding optimized position of the third initial three-dimensional coordinates.

In some embodiments, the drone is provided with a laser device; and the apparatus further includes:

a fourth control module, configured to control, when the wind turbine is in a stationary state, the drone to fly around the blades on the wind turbine based on all relative angles, and control the laser device to perform laser ranging on the blades multiple times by scanning all the time in a process of flying around the blades, so as to obtain a plurality of laser ranging results, and establish a current model for the blades according to the plurality of laser ranging results;

a comparison module, configured to compare the current model with a preset model, to obtain a model comparison result, wherein the preset model is a model of the blades in a normal state of the wind turbine before running; and a detection module, configured to detect a damage degree of a blade surface of the wind turbine according to the model comparison result.

In some embodiments, the apparatus further includes:

a fifth control module, configured to control, when the wind turbine is in operation, the drone to fly at a flying speed with respect to the blades that is kept greater than a rotating speed of the blades, so as to acquire the laser ranging results for a plurality of positions on the blades.

In some embodiments, at least two drones are provided; and the apparatus further includes:

a sixth control module, configured to control, when the wind turbine is in operation, a first drone to fly at the same speed as the rotating speed of the blades, so as to keep the first drone and the blades relatively stationary; and a seventh control module, configured to control a second drone to fly at the flying speed with respect to the blades that is kept greater than the rotating speed of the blades, take the second drone as a scanning drone for the blades, and take the first drone as a reference in a scanning process of the second drone, and acquire the laser ranging results for the plurality of positions on the blades through position data with the first drone as the reference and scanning data of the second drone for the blades.

In some embodiments, the apparatus further includes:

a measurement module, configured to measure, by the first drone, according to its flying speed and flying position following the blades, the rotating speed of the blades, and control the flying speed of the second drone according to the rotating speed of the blades, so as to keep the flying speed of the second drone greater than the rotating speed of the blades;

a sending module, configured to send to the first drone, by the second drone, laser ranging data obtained by scanning the blades; and a calculation module, configured to calculate, by the first drone, data of a plurality of position points on the surfaces of the blades through AI according to the laser ranging data and the rotating speed of the blades.

In some embodiments, the apparatus further includes:

an eighth control module, configured to, take, when a current electric quantity of the second drone is less than a first preset electric quantity, the first drone as the scanning drone for the blades, and take the second drone as the reference in the scanning process of the first drone, control the first drone to fly at the flying speed with respect to the blades that is kept greater than the rotating speed of the blades, and control the second drone to fly at the same speed as the rotating speed of the blades, so as to keep the second drone and the blades relatively stationary; and a first acquisition module, configured to acquire the laser ranging results for the plurality of positions on the blades, through position data with the second drone as the reference and scanning data of the first drone for the blades.

In some embodiments, the apparatus further includes:

a ninth control module, configured to take, when a difference between current electric quantities of the first drone and of the second drone is greater than a second preset electric quantity, the first drone as the scanning drone for the blades, and take the second drone as the reference in the scanning process of the first drone, control the first drone to fly at the flying speed with respect to the blades that is kept greater than the rotating speed of the blades, and control the second drone to fly at the same speed as the rotating speed of the blades, so as to keep the second drone and the blades relatively stationary; and a second acquisition module, configured to acquire the laser ranging results for the plurality of positions on the blades, through position data with the second drone as the reference and scanning data of the first drone for the blades.

The apparatus for detecting a wind turbine blade based on drone aerial photography provided in the embodiment of the present disclosure has the same technical features as the method for detecting a wind turbine blade based on drone aerial photography provided in the above embodiment, and therefore can also solve the same technical problems and achieve the same technical effects.

Figure 4:
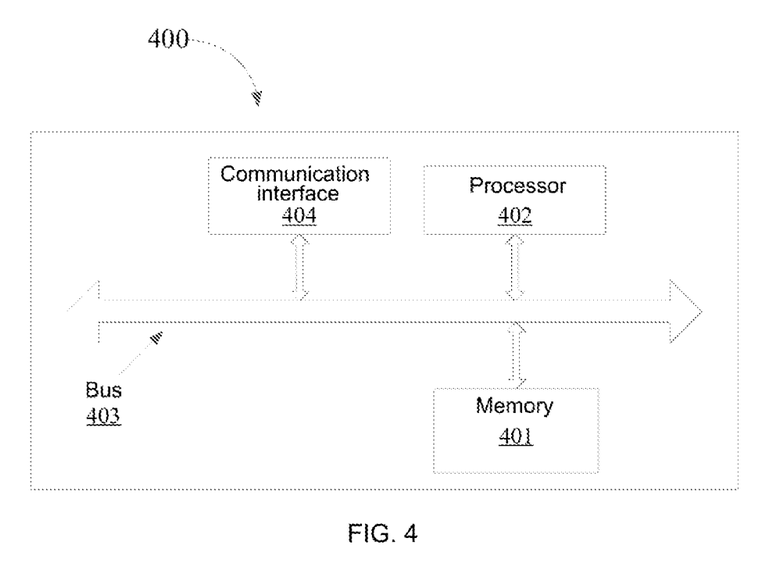
FIG. 4 shows a structural schematic diagram of an electronic device provided in an embodiment of the present disclosure.

An embodiment of the present disclosure provides an electronic device. As shown in FIG. 4, the electronic device 400 includes a processor 402 and a memory 401, wherein the memory stores a computer program that can run on the processor, and when the processor executes the computer program, the steps of the method provided in the above embodiment are implemented.

Referring to FIG. 4, the electronic device further includes: a bus 403 and a communication interface 404, wherein the processor 402, the communication interface 404, and the memory 401 are connected via the bus 403; and the processor 402 is configured to execute an executable module, e.g., a computer program, stored in the memory 401.

In the above, the memory 401 may include a high-speed random access memory (RAM for short), and also may include a non-volatile memory, for example, at least one disk memory. Communication connection between this system network element and at least one other network element is achieved via at least one communication interface 404 (which may be wired or wireless), and Internet, Wide Area Network, local network, Metropolitan Area Network and so on can be used.

The bus 403 may be an ISA bus, a PCI bus, an EISA bus, or the like. The bus may be an address bus, a data bus, a control bus and so on. For easy representation, the bus is represented merely with one two-way arrow in FIG. 4, but it does not mean that there is only one bus or one type of bus.

In the above, the memory 401 is configured to store a program, and the processor 402 executes the program upon receipt of an execution instruction. The method executed by the apparatus defined by the process disclosed in any embodiment of the present disclosure in the preceding can be applied to the processor 402, or realized by the processor 402.

The processor 402 may be an integrated circuit chip, capable of processing signals. In an implementation process, various steps in the above method can be completed by an integrated logic circuit of hardware in the processor 402 or an instruction in a software form. The above processor 402 may be a general-purpose processor, including a central processing unit (CPU for short), a network processor (NP for short), etc., and also may be a digital signal processor (DSP for short), an application specific integrated circuit (ASIC for short), a field-programmable gate array (FPGA for short) or other programmable logic devices, discrete gates, transistor logic devices, or discrete hardware components that can realize or implement various methods, steps, and logic blocks disclosed in the embodiments of the present disclosure. A general-purpose processor may be a microprocessor, and alternatively, the processor also may be any conventional processor or the like. The steps in the method disclosed in the embodiments of the present disclosure may be directly embodied to be carried out and completed by a hardware decoding processor, or carried out and completed by a combination of hardware and software modules in the decoding processor. The software module may be located in a mature storage medium in the art, such as a random access memory, a flash memory, a read-only memory, a programmable read-only memory or an electrically erasable programmable memory, and a register. The storage medium is located in the memory 401, and the processor 402 reads information in the memory 401, and completes the steps of the above method in combination with its hardware.

Corresponding to the above method for detecting a wind turbine blade based on drone aerial photography, an embodiment of the present disclosure further provides a computer-readable storage medium. The computer-readable storage medium stores computer-executable instructions. When the computer-executable instructions are invoked and executed by a processor, the computer-executable instructions cause the processor to execute the steps in the above method for detecting a wind turbine blade based on drone aerial photography.

The apparatus for detecting a wind turbine blade based on drone aerial photography provided in the embodiments of the present disclosure may be specific hardware on a device or software or firmware installed on a device, or the like. The implementation principles and the technical effects produced by the apparatus provided in the embodiments of the present disclosure are the same as those of the preceding method embodiments. For briefness of the description, for parts that are not mentioned in the apparatus embodiments, reference can be made to corresponding contents in the preceding method embodiments. Those skilled in the art could clearly know that for the convenience and conciseness of the description, reference can be made to corresponding processes in the above method embodiments for specific operation processes of the system, apparatus, and units described in the preceding, which will not be repeated redundantly herein.

In the embodiments provided in the present disclosure, it should be understood that the apparatus and the method disclosed may be implemented in other manners. The apparatus embodiments described in the above are merely exemplary, for example, the units are merely divided according to logical functions, but they may be divided in other ways in practical implementation; and for another example, multiple units or components may be combined or may be integrated into another system, or some features may be omitted, or not executed. In addition, mutual coupling or direct coupling or communication connection as shown or discussed may be realized via some communication interfaces, and indirect coupling or communication connection between means or units may be in an electrical form, a mechanical form or other forms.

For another example, the flowchart and the block diagrams in the drawings illustrate system architectures, functions, and operations of the apparatus, the method, and the computer program product that can be realized according to multiple embodiments of the present disclosure. In this regard, each block in the flowchart or the block diagrams may represent a part of a module, a program segment, or a code, which contains one or more executable instructions configured to realize a specified logical function. It also should be noted that in some implementation modes as substitutions, the functions marked in the blocks also can take effect in an order different than that marked in the drawings. For example, two continuous blocks actually may be concurrently executed substantially, or they sometimes also may be executed in a reverse order, which depends upon the function involved. It also should be noted that each block in the block diagrams and/or the flowchart, or a combination of blocks in the block diagrams and/or the flowchart can be realized by a dedicated hardware-based system used to execute a specified function or action, or can be realized by a combination of dedicated hardware and computer instructions.

The units described as separate components may or may not be physically separated, and components displayed as units may or may not be physical units, that is, they may be located at one place, or also may be distributed on a plurality of network units. Some or all of the units can be selected according to actual needs to achieve the objectives of the solutions in the embodiments.

In addition, each functional unit in the embodiments provided in the present disclosure can be integrated into one processing unit, or each unit also may exist physically alone, or two or more units may also be integrated into one unit.

If the function is realized in a form of software functional unit and is sold or used as an individual product, it may be stored in a computer readable storage medium. Based on such understanding, the technical solutions of the present disclosure in essence or parts making contribution to the related art or parts of the technical solutions may be embodied in a form of software product. This computer software product is stored in a storage medium, which includes several instructions for causing one computer device (which may be a personal computer, a server or a network device etc.) execute all or part of the steps of the method for detecting a wind turbine blade based on drone aerial photography in various embodiments of the present disclosure. The aforementioned storage medium includes: U disk, mobile hard disk, read-only memory (ROM for short), random access memory (RAM for short), magnetic disk or optical disk and various media that can store program codes.

It should be noted that similar reference signs and letters represent similar items in the following drawings; therefore, once a certain item is defined in one drawing, it is unnecessary to further define or explain the same in subsequent drawings. Besides, the terms "first", "second", "third", etc. are only used to distinguish the description, but should not be construed as indicating or implying importance in relativity.

Finally, it should be noted that the above-mentioned embodiments are only specific embodiments of the present disclosure, and are used to illustrate the technical solutions of the present disclosure, but not to limit the same, and the scope of protection of the present disclosure is not limited thereto. While the present disclosure is disclosed in detail with reference to the foregoing embodiments, those ordinarily skilled in the art should understand that any person familiar with the technical field still could make modifications to the technical solutions described in the foregoing embodiments, could easily think of changes, or make equivalent substitutions to some of the technical features, within the technical scope disclosed in the present disclosure; however, these modifications, changes or substitutions do not make the essence of the corresponding technical solutions depart from the scope of the technical solutions of the embodiments in the present disclosure, and they all should be covered within the scope of protection of the present disclosure. Therefore, the scope of protection of the present disclosure should be based on the scope of protection of the claims.

INDUSTRIAL APPLICABILITY

The present disclosure, pertaining to the technical field of power equipment, provides a method, an apparatus, an electronic device, and a computer-readable storage medium for detecting a wind turbine blade based on drone aerial photography, and alleviates the technical problem of relatively low detection accuracy of the damages on the surfaces of the blades. The method includes: determining first initial three-dimensional position coordinates and a posture of a wind turbine; determining second initial three-dimensional coordinates of a first expected position with respect to a front shooting position of the wind turbine, based on the first initial three-dimensional position coordinates, the posture, and a preset distance; inputting the second initial three-dimensional coordinates of the first expected position into a flight control system of the drone, and controlling the drone to fly to the second initial three-dimensional coordinates based on a GPS system; and controlling the drone to track at least one first key point of blades of the wind turbine in a first posture with a binocular camera at an actual three-dimensional coordinates based on the orientation of the wind turbine, and determining a three-dimensional movement trajectory of the first key point in a camera coordinate system.

In addition, it can be understood that the method, the apparatus, and the electronic device for detecting a wind turbine blade based on drone aerial photography in the present disclosure are reproducible, and is applicable in various industrial applications. For example, the method for detecting a wind turbine blade in the present disclosure is applicable in the field of power equipment.

The invention claimed is:

1. A method for detecting a wind turbine blade based on drone aerial photography, comprising:

determining first initial three-dimensional position coordinates and a posture of a wind turbine, wherein the first initial three-dimensional position coordinates are coordinates in a GPS system, and the posture comprises an orientation of the wind turbine;

determining second initial three-dimensional coordinates of a first expected position with respect to a front shooting position of the wind turbine, based on the first initial three-dimensional position coordinates, the posture, and a preset distance, wherein the first expected position is located on a first normal vector corresponding to a first rotation center of a blade rotation plane of the wind turbine, and a distance between the first expected position and the first rotation center is the preset distance;

inputting the second initial three-dimensional coordinates of the first expected position into a flight control system of the drone, and controlling the drone to fly to the second initial three-dimensional coordinates based on the GPS system, wherein an actual position of the drone is actual three-dimensional coordinates, and an offset between the first expected position and the actual three-dimensional coordinates is a target offset vector;

controlling, based on the orientation of the wind turbine, the drone to track at least one first key point of blades of the wind turbine in a first posture with a binocular camera at the actual three-dimensional coordinates, and determining a three-dimensional movement trajectory of the first key point in a camera coordinate system;

determining, in the camera coordinate system of the binocular camera, a second normal vector of a second rotation center corresponding to the three-dimensional movement trajectory of the first key point, converting the first normal vector into the camera coordinate system to obtain a third normal vector, and determining a first rotation matrix based on the second normal vector and the third normal vector;

adjusting an orientation of the binocular camera based on the first rotation matrix, so that an actual orientation of a camera head of the binocular camera tends to be parallel to a normal corresponding to the first rotation center of an actual blade rotation plane, to obtain a second posture; tracking at least one second key point of the blades with the binocular camera in the second posture, and determining a three-dimensional movement trajectory of the second key point in the camera coordinate system and determining a second rotation matrix;

judging whether a difference between the second rotation matrix determined and the first rotation matrix meets a preset requirement, wherein if the preset requirement is met, the posture of the camera is controlled based on the orientation of the wind turbine and the second rotation matrix to shoot a front image of the wind turbine; and if the preset requirement is not met, iteration is continued until a difference between two adjacent rotation matrices meets the preset requirement or number of the iterations reaches a preset number; and determining third initial three-dimensional coordinates of a second expected position with respect to a back shooting position of the wind turbine based on the first initial three-dimensional position coordinates, the posture, and the preset distance, inputting the third initial three-dimensional coordinates of the second expected position into the flight control system of the drone, controlling, based on the GPS system, the drone to fly to a corresponding optimized position of the third initial three-dimensional coordinates, and controlling the camera to shoot a back image of the wind turbine based on the orientation of the wind turbine and the second rotation matrix at the corresponding optimized position of the third initial three-dimensional coordinates.

2. The method for detecting a wind turbine blade according to claim 1, wherein the drone is provided with a laser device; and the method for detecting a wind turbine blade further comprises:

controlling, when the wind turbine is in a stationary state, the drone to fly around the blades on the wind turbine based on all relative angles, and controlling the laser device to perform laser ranging on the blades multiple times by scanning all the time, in a process of flying around the blades, so as to obtain a plurality of laser ranging results, and establishing a current model for the blades according to the plurality of laser ranging results;

comparing the current model with a preset model to obtain a model comparison result, wherein the preset model is a model of the blades in a normal state of the wind turbine before running; and detecting a damage degree of a blade surface of the wind turbine according to the model comparison result.

3. The method for detecting a wind turbine blade according to claim 2, further comprising:

controlling, when the wind turbine is in operation, the drone to fly at a flying speed with respect to the blades that is kept greater than a rotating speed of the blades, so as to acquire the laser ranging results for a plurality of positions on the blades.

4. The method for detecting a wind turbine blade according to claim 3, wherein at least two drones are provided; and the method for detecting a wind turbine blade further comprises:

controlling, when the wind turbine is in operation, a first drone to fly at the same speed as the rotating speed of the blades, so as to keep the first drone and the blades relatively stationary; and controlling a second drone to fly at a flying speed with respect to the blades that is kept greater than the rotating speed of the blades, taking the second drone as a scanning drone for the blades and taking the first drone as a reference in a scanning process of the second drone, and acquiring the laser ranging results for the plurality of positions on the blades, through position data with the first drone as the reference and scanning data of the second drone for the blades.

5. The method for detecting a wind turbine blade according to claim 4, further comprising:

measuring, by the first drone, according to its flying speed and flying position following the blades, the rotating speed of the blades, and controlling the flying speed of the second drone according to the rotating speed of the blades, so as to keep the flying speed of the second drone greater than the rotating speed of the blades;

sending, by the second drone to the first drone, laser ranging data obtained by scanning the blades; and calculating, by the first drone, data of a plurality of position points on surfaces of the blades through AI according to the laser ranging data and the rotating speed of the blades.

6. The method for detecting a wind turbine blade according to claim 5, further comprising:
taking, when a current electric quantity of the second drone is less than a first preset electric quantity, the first drone as the scanning drone for the blades, and taking the second drone as the reference in a scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and
acquiring the laser ranging results for the plurality of positions on the blades, through position data with the second drone as the reference and scanning data of the first drone for the blades.

7. The method for detecting a wind turbine blade according to claim 5, further comprising:
taking, when a difference between current electric quantities of the first drone and of the second drone is greater than a second preset electric quantity, the first drone as the scanning drone for the blades, and taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and
acquiring the laser ranging results for the plurality of positions on the blades, through position data with the second drone as the reference and scanning data of the first drone for the blades.

8. The method for detecting a wind turbine blade according to claim 4, further comprising:
taking, when a current electric quantity of the second drone is less than a first preset electric quantity, the first drone as the scanning drone for the blades, and taking the second drone as the reference in a scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and
acquiring the laser ranging results for the plurality of positions on the blades, through position data with the second drone as the reference and scanning data of the first drone for the blades.

9. The method for detecting a wind turbine blade according to claim 4, further comprising:
taking, when a difference between current electric quantities of the first drone and of the second drone is greater than a second preset electric quantity, the first drone as the scanning drone for the blades, and taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and
acquiring the laser ranging results for the plurality of positions on the blades, through position data with the second drone as the reference and scanning data of the first drone for the blades.

10. An electronic device, comprising a memory and a processor, wherein the memory stores a computer program executable on the processor, wherein when the processor performs the computer program, the method for detecting a wind turbine blade according to claim 1 is implemented.

11. The electronic device according to claim 10, wherein the drone is provided with a laser device; and the method for detecting a wind turbine blade further comprises:
controlling, when the wind turbine is in a stationary state, the drone to fly around the blades on the wind turbine based on all relative angles, and controlling the laser device to perform laser ranging on the blades multiple times by scanning all the time, in a process of flying around the blades, so as to obtain a plurality of laser ranging results, and establishing a current model for the blades according to the plurality of laser ranging results;
comparing the current model with a preset model to obtain a model comparison result, wherein the preset model is a model of the blades in a normal state of the wind turbine before running; and
detecting a damage degree of a blade surface of the wind turbine according to the model comparison result.

12. The electronic device according to claim 11, wherein the method for detecting a wind turbine blade further comprises:
controlling, when the wind turbine is in operation, the drone to fly at a flying speed with respect to the blades that is kept greater than a rotating speed of the blades, so as to acquire the laser ranging results for a plurality of positions on the blades.

13. The electronic device according to claim 12, wherein at least two drones are provided; and the method for detecting a wind turbine blade further comprises:
controlling, when the wind turbine is in operation, a first drone to fly at the same speed as the rotating speed of the blades, so as to keep the first drone and the blades relatively stationary; and
controlling a second drone to fly at a flying speed with respect to the blades that is kept greater than the rotating speed of the blades, taking the second drone as a scanning drone for the blades and taking the first drone as a reference in a scanning process of the second drone, and acquiring the laser ranging results for the plurality of positions on the blades, through position data with the first drone as the reference and scanning data of the second drone for the blades.

14. The electronic device according to claim 13, wherein the method for detecting a wind turbine blade further comprises:
taking, when a current electric quantity of the second drone is less than a first preset electric quantity, the first drone as the scanning drone for the blades, and taking the second drone as the reference in a scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and acquiring the laser ranging results for the plurality of positions on the blades, through position data with the second drone as the reference and scanning data of the first drone for the blades.

15. The electronic device according to claim 13, wherein the method for detecting a wind turbine blade further comprises:

taking, when a difference between current electric quantities of the first drone and of the second drone is greater than a second preset electric quantity, the first drone as the scanning drone for the blades, and taking the second drone as the reference in the scanning process of the first drone, controlling the first drone to fly at the flying speed with respect to the blades that is kept greater than the rotating speed of the blades, and controlling the second drone to fly at the same speed as the rotating speed of the blades, so as to keep the second drone and the blades relatively stationary; and acquiring the laser ranging results for the plurality of positions on the blades, through position data with the second drone as the reference and scanning data of the first drone for the blades.

16. The electronic device according to claim 13, wherein the method for detecting a wind turbine blade further comprises:

measuring, by the first drone, according to its flying speed and flying position following the blades, the rotating speed of the blades, and controlling the flying speed of the second drone according to the rotating speed of the blades, so as to keep the flying speed of the second drone greater than the rotating speed of the blades;

sending, by the second drone to the first drone, laser ranging data obtained by scanning the blades; and calculating, by the first drone, data of a plurality of position points on surfaces of the blades through AI according to the laser ranging data and the rotating speed of the blades.

17. A non-transitory computer-readable storage medium, storing computer-executable instructions, wherein when the computer-executable instructions are invoked and executed by a processor, the computer-executable instructions cause the processor to execute the method for detecting a wind turbine blade according to claim 1.

18. The non-transitory computer-readable storage medium according to claim 17, wherein the drone is provided with a laser device; and the method for detecting a wind turbine blade further comprises:

controlling, when the wind turbine is in a stationary state, the drone to fly around the blades on the wind turbine based on all relative angles, and controlling the laser device to perform laser ranging on the blades multiple times by scanning all the time, in a process of flying around the blades, so as to obtain a plurality of laser ranging results, and establishing a current model for the blades according to the plurality of laser ranging results;

comparing the current model with a preset model to obtain a model comparison result, wherein the preset model is a model of the blades in a normal state of the wind turbine before running; and detecting a damage degree of a blade surface of the wind turbine according to the model comparison result.

19. The non-transitory computer-readable storage medium according to claim 18, wherein the method for detecting a wind turbine blade further comprises:

controlling, when the wind turbine is in operation, the drone to fly at a flying speed with respect to the blades that is kept greater than a rotating speed of the blades, so as to acquire the laser ranging results for a plurality of positions on the blades.

20. The non-transitory computer-readable storage medium according to claim 19, wherein at least two drones are provided; and the method for detecting a wind turbine blade further comprises:

controlling, when the wind turbine is in operation, a first drone to fly at the same speed as the rotating speed of the blades, so as to keep the first drone and the blades relatively stationary; and controlling a second drone to fly at a flying speed with respect to the blades that is kept greater than the rotating speed of the blades, taking the second drone as a scanning drone for the blades and taking the first drone as a reference in a scanning process of the second drone, and acquiring the laser ranging results for the plurality of positions on the blades, through position data with the first drone as the reference and scanning data of the second drone for the blades.

* * * * *